US011183187B2

(12) United States Patent
Sugiyama et al.

(10) Patent No.: US 11,183,187 B2
(45) Date of Patent: Nov. 23, 2021

(54) DIALOG METHOD, DIALOG SYSTEM, DIALOG APPARATUS AND PROGRAM THAT GIVES IMPRESSION THAT DIALOG SYSTEM UNDERSTANDS CONTENT OF DIALOG

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Toyomi Meguro, Soraku-gun (JP); Junji Yamato, Soraku-gun (JP); Yuichiro Yoshikawa, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 55 days.

(21) Appl. No.: 16/301,496

(22) PCT Filed: May 19, 2017

(86) PCT No.: PCT/JP2017/018789
§ 371 (c)(1),
(2) Date: Nov. 14, 2018

(87) PCT Pub. No.: WO2017/200074
PCT Pub. Date: Nov. 23, 2017

(65) Prior Publication Data

US 2019/0294638 A1 Sep. 26, 2019

(30) Foreign Application Priority Data

May 20, 2016 (JP) ................................ 2016-101219

(51) Int. Cl.
*G10L 15/22* (2006.01)
*G06F 16/9038* (2019.01)
(Continued)

(52) U.S. Cl.
CPC .......... *G10L 15/22* (2013.01); *G06F 16/9038* (2019.01); *G06F 16/90332* (2019.01); *G06F 40/205* (2020.01); *G06F 40/284* (2020.01)

(58) Field of Classification Search
CPC ........................... G06F 16/90332; G10L 15/22
See application file for complete search history.

(56) References Cited

U.S. PATENT DOCUMENTS 5,357,596 A * 10/1994 Takebayashi ............. G06F 3/16 704/251
6,556,970 B1 * 4/2003 Sasaki ................ G01C 21/3608 382/100

(Continued)

OTHER PUBLICATIONS

English translation of International Search Report dated Aug. 1, 2017 in PCT/JP2017/018789, 3 pages.

(Continued)

*Primary Examiner* — Shaun Roberts
(74) *Attorney, Agent, or Firm* — Oblon, McClelland, Maier & Neustadt, L.L.P.

(57) ABSTRACT

The present invention provides a dialog system comprising a speech receiving step in which the dialog system receives input of a speech of a human, a first speech determination step in which the dialog system determines a first speech which is a speech in response to the speech of the human, a first speech presentation step in which the first speech is presented by a first agent, a reaction acquisition step in which the dialog system acquires a reaction of the human to the first speech, a second speech determination step in which the dialog system determines, when the reaction of the human is a reaction indicating that the first speech is not a (Continued)

speech in response to the speech of the human, a second speech which is different from the first speech, and a second speech presentation step in which the second speech is presented by the second agent.

8 Claims, 4 Drawing Sheets

(51) Int. Cl.

| | |
|---|---|
| ***G06F 16/9032*** | (2019.01) |
| ***G06F 40/205*** | (2020.01) |
| ***G06F 40/284*** | (2020.01) |

(56) References Cited

U.S. PATENT DOCUMENTS 7,162,422 B1 * 1/2007 Bennett .................. G10L 15/08 704/236
2002/0049805 A1 * 4/2002 Yamada .................. G06F 3/167 709/202
2004/0153211 A1 * 8/2004 Kamoto ................. G06N 3/008 700/245
2015/0066479 A1 * 3/2015 Pasupalak ........... G06F 16/9535 704/9
2015/0138074 A1 * 5/2015 Hennelly ............ G06F 3/04812 345/156

OTHER PUBLICATIONS

Yasuhiro Arimoto, et al., "Impression Evaluation of Dialogue without Voice Recognition by Plural Robots" Conference of the Robotics Society of Japan, 2016, 9 pages (with partial English translation).

Hiroaki Sugiyama, et al., "Leveraging Dependency Relations and Sentence Examples in Web-scale Corpus for Open-domain Utterance Generation" Transactions of the Japanese Society for Artificial Intelligence, Journal, vol. 30 (1), 2015, pp. 183-194 (with partial English translation).

Ryuichiro Higashinaka, et al., "Project Next NLP Dialog Task: Collection of Idle Talk Dialog Data, Dialog Failure Annotation and Typification thereof" Association for Natural Language Processing Annual Association Conference, 2015, 31 pages (with partial English translation).

Hiroaki Sugiyama, "Chat-oriented Dialogue Breakdown Detection Based on Combination of Various Data" Sixth Dialogue System symposium (SIG-SLUD), The Japanese Society for Artificial Intelligence, 6th Dialogue System Symposium, 2015, pp. 51-56 (with English translation).

Masahiro Mizunoue, et al. "Example Based Dialog System Based on Amenity Estimation", Japanese Society for Artificial Intelligence, Journal, vol. 31, No. 1, 2016, 13 pages (with English translation).

* cited by examiner

DIALOG METHOD, DIALOG SYSTEM, DIALOG APPARATUS AND PROGRAM THAT GIVES IMPRESSION THAT DIALOG SYSTEM UNDERSTANDS CONTENT OF DIALOG

TECHNICAL FIELD

The present invention relates to a technique for a computer to have a dialog with a human using a natural language, which is applicable to robots or the like communicating with the human.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, and also can show the resident having dialogue with the robot to make chances to start dialogue between the resident and people around the resident such as his/her family and careworkers. In addition, at the site of a communication training, there is a usage pattern in which a robot becomes a training partner. More specifically, the robot becomes a training partner for foreign language learners at a foreign language learning facility, thus helping the foreign language learners to efficiently proceed with foreign language learning. Furthermore, in an application as an information presentation system, robots perform a dialog with each other and have their dialog heard by people as a basis, sometimes talk to people, cause the people to join in dialogue without making the people bored, and can thereby present information in a form easily acceptable to the people. More specifically, when people feel bored at meeting places, bus stops, a platform at a station or the like in a town or when people can afford to participate in a dialog at home or a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialog through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among the users. By applying a technique of dialogue between users and robots to this chat service, it is possible to implement a chat service whereby robots can have dialogue with users more naturally even in the absence of any user as a chatting partner. In the present specification, hardware which becomes a dialog partner of a user such as robots used in these services or chat partner or computer software for causing a computer to function as hardware to become the user's dialog partner are generically called an "agent." Since the agent is intended to become the user's dialog partner, the agent may be personified such as a robot or chat partner, personalized or may possess characters or individuality.

The key to the implementation of these services is a technique that enables the agent implemented by hardware or computer software to perform a dialog with humans naturally.

Non-patent literatures 1 and 2 are known as prior arts of a dialog system. According to non-patent literature 1, a speech is generated according to a predetermined scenario. According to non-patent literature 2, the next speech is generated only based on the last or before the last speech of a person or a dialog system.

PRIOR ART LITERATURE

Non-Patent Literature

Non-patent literature 1: Yasuhiro Arimoto, Yuichiro Yoshikawa, Hiroshi Ishiguro, "Impression Evaluation of Dialog without Voice Recognition by Plural Robots," Conference of the Robotics Society of Japan, 2016

Non-patent literature 2: Hiroaki Sugiyama, Toyomi Meguro, Ryuichiro Higashinaka, Yasuhiro Minami, "Generation of Response Statement using Dependency and Examples with Respect to User Speech Having Arbitrary Topics" Japanese Society for Artificial Intelligence, Journal, vol. 30(1), pp. 183-194, 2015

SUMMARY OF THE INVENTION

Problems to be Solved by the Invention

However, current dialog systems often utter an inappropriate system speech in response to a user speech (Reference Literature 1). It is not easy even for humans to think of the next speech for such a system speech. Furthermore, a lack of the intention of the dialog systems to continue the dialog may disappoint the user and cause a dialog failure. To avoid such a dialog failure, it is preferable to detect such a failed speech before it occurs, but it is difficult to detect it completely (Reference Literature 2). Note that the "failed speech" refers to a system speech which is not appropriate to a user speech and means a system speech which is not a speech in response to the user's speech.

(Reference Literature 1): Ryuichiro Higashinaka, Kotaro Funagoshi, Masahiro Araki, Yuji Tsukahara, Yuka Kobayashi, Masahiro Mizunoue, "Project Next NLP Dialog Task: Collection of Idle Talk Dialog Data, Dialog Failure Annotation and Typification thereof", Association for Natural Language Processing Annual Association Conference, 2015

(Reference Literature 2): Hiroaki Sugiyama, "Detection of Failure of Idle Talk Dialog by Combination of Data Having Different Characteristics," 75th Special Interest Group on Spoken Language Understanding and Dialogue Processing (SIG-SLUD), Japanese Society for Artificial Intelligence, 6th Dialogue System Symposium, 2015

The conventional dialog system tends to proceed with a dialog without being aware that the dialog system itself causes a dialog failure. Therefore, the dialog system gives the user an impression that the dialog system engages in the dialog without understanding the contents of the dialog.

It is an object of the present invention to provide a dialog method, a dialog system, a dialog apparatus and a program that detect a failed speech after a system speech, decide the next action in consideration of the failure, and thereby give the user an impression that the dialog system engages in the dialog by understanding the contents of the dialog.

Means to Solve the Problems

In order to solve the above-described problems, according to an aspect of the present invention, a dialog method performed by a dialog system comprises a first agent and a second agent, the method comprising a speech receiving step in which the dialog system receives input of a speech of a human, a first speech determination step in which the dialog system determines a first speech which is a speech in response to the speech of the human, a first speech presentation step in which the first speech is presented by a first agent, a reaction acquisition step in which the dialog system acquires a reaction of the human to the first speech, a second speech determination step in which the dialog system determines, when the reaction of the human indicates that the first speech is not a speech in response to the speech of the human, a second speech which is different from the first speech, and a second speech presentation step in which the second speech is presented by the second agent.

In order to solve the above-described problems, according to another aspect of the present invention, a dialog system comprises a speech receiving part that receives input of a speech of a human, a first speech determination part that determines a first speech which is a speech in response to the speech of the human, a first agent that presents the first speech, a reaction acquisition part that acquires a reaction of the human to the first speech, a second speech determination part that determines, when the reaction of the human is a reaction indicating that the first speech is not a speech in response to the speech of the human, a second speech which is a speech different from the first speech, and a second agent that presents the second speech.

In order to solve the above-described problems, according to a further aspect of the present invention, a dialog apparatus comprises a first speech determination part that determines a first speech which is a speech in response to an inputted human speech and is a speech presented by a first agent, and a second speech determination part that determines, when the reaction of the human to the first speech is a reaction indicating that the first speech is not a speech in response to the speech of the human, a second speech which is a speech different from the first speech and is a speech presented by a second agent.

Effects of the Invention

According to the present invention, it is possible to exert an effect that the dialog system gives the user an impression that the dialog system engages in a dialog by understanding contents of the dialog.

DETAILED DESCRIPTION OF THE EMBODIMENTS

Figure 1:
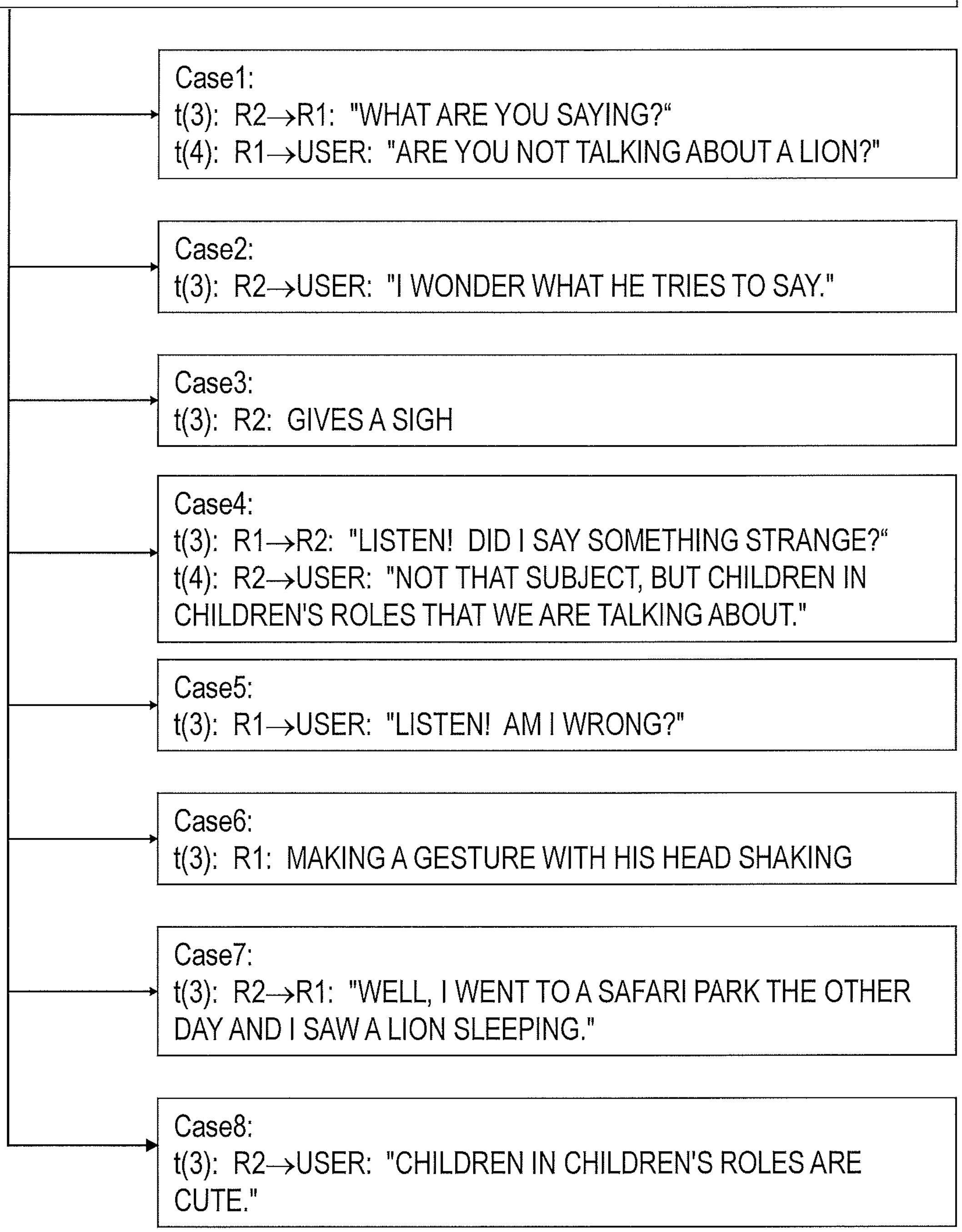
FIG. 1 is a diagram illustrating a dialog example of a dialog system according to a first embodiment.

Hereinafter, an embodiment of the present invention will be described. Note that in the drawings used for the following description, components having identical functions and steps of performing identical processes are assigned identical reference numerals and overlapping description will be omitted.

Points of First Embodiment

The present embodiment uses not only contents of a system speech but also a change in facial expression of a user who hears the system speech to detect a failure. Detection of a failure only from contents of the system speech before the speech requires an understanding of a complicated semantic structure, but incorporation of the user's reaction into a failure detection mechanism allows more reliable detection of a failure.

On the other hand, to detect a failed speech using the above-described method, the dialog system actually utters a speech, observes the user's reaction and detects, from the user's reaction observed, whether or not the speech of the dialog system is a failed speech. At this time, the user recognizes that the dialog system has uttered a failed speech. Therefore, it is important to support the user after the dialog system utters a failed speech.

FIG. 1 shows a diagram illustrating a dialog example of a dialog system and a user according to the first embodiment. Note that t(v) means v-th language communication (speech) or non-language communication and X-Y means that X utters a speech to Y.

The dialog system of the present embodiment brings up the failure itself as a topic and thereby expresses to the user that the dialog system recognizes the fact that it has caused "the failure" (Case 1 to Case 6 in FIG. 1). Through this expression, it is possible to show to the user that the dialog system correctly understands the contents of the own speech and that the dialog system is sensitive to the user's behavior. Therefore, the user satisfaction level is considered to improve.

Furthermore, when there are two robots, the failure itself may be brought up as a topic between the robots, which may give the user an impression that the robot which is not responsible for the failed speech is a wiser robot. Furthermore, it is possible to give the user an impression that the dialog system is engaged with the dialog by understanding contents of the dialog (Case 1 to Case 4 in FIG. 1).

After one robot expresses to the user that the dialog system recognizes that it has caused "the failure", the other robot utters a speech different from the failed speech (Case 4 in FIG. 1). Alternatively, the robot utters a speech different from the failed speech by putting a topic changing word before the speech (Case 7 in FIG. 1). The dialog system can thereby lessen the user's impression that the dialog system engages in the dialog without understanding contents of the dialog. That is, the dialog system can lessen the user's disappointment with the robot. In other words, the dialog system can give the user an impression that the dialog system engages in the dialog by understanding contents of the dialog.

The robot not responsible for the failed speech may continue the dialog with the user by ignoring the contents of the failed speech, and can thereby lessen the user's disappointment with the whole dialog system (Case 8 or the like in FIG. 1). In other words, it is possible to give the user an impression that the dialog system engages in the dialog by understanding contents of the dialog.

In addition, since the two robots support each other, even when a failed speech is uttered once, the dialog itself is less likely to fail (Case 4 and Case 8 in FIG. 1). Taking advantage of this, for a speech which would ordinarily be generated as a first best as the speech of the robot in response to the user's speech, a plurality of candidates may be generated as a second best, a fourth best, etc., one of the plurality of candidates may be assumed as the speech of the robot in response to the user's speech, and another one among the plurality of candidates may be adopted as the speech to be uttered by the robot in the case where a failed speech by a robot occurs. In this case, selecting a candidate with the smaller degree of similarity among speeches rather than a similar candidate may be less likely to cause a failure. Furthermore, in the stage of generating a plurality of candidates, candidates may be generated in advance so as to reduce the degree of similarity among speeches.

Hereinafter, an example of a case will be described in Specific Example 1, where a robot R2 expresses that a robot R1 has caused or may possibly have caused a dialog failure.

Specific Example 1 t(1): User→R1, R2: "Recently, I went to see Lion King (registered trademark) and found that children in children's roles did great performance."
t(2): R1→user: "They say female lions go hunting" (failed speech in reaction to "lion").

When the recognition result of the reaction of the user to speech t(2) of the robot R1 is not a speech in response to a speech t(1) of the user (the robot R1 has caused a failure)," the robot R2 takes action of clearly expressing that "the speech of the robot R1 is not a speech in response to the user's speech."

Case 1:
t(3): R2→R1: "What are you saying?"
t(4): R1→user: "Are you not talking about a lion?"
Case 2:
t(3): R2→user: "I wonder what he tries to say."
Case 3:
t(3): R2: Gives a sigh In Case 1, as the speech directed to the robot R1, the robot R2 expresses in a speech t(3) that the robot R1 has caused the failed speech or suggests a possibility that the robot R1 might have caused the failed speech.

In Case 2, as the speech to the user, in the speech t(3) the robot R2 expresses that the robot R1 has caused the failed speech or suggests a possibility that the robot R1 might have caused the failed speech.

In Case 3, anyone other than the one that has uttered the speech t(2) (robot R2 which is a robot other than the robot R1 that has uttered the speech t(2) in this example) expresses that the robot R1 has caused the failed speech or the possibility that the robot R1 might have caused the failed speech through non-language communication t(3) as a speech directed to none of them (speech in response to neither speech t(1) nor t(2) in this example) or as an expression of the intention. In this example, the robot R2 gives a sigh in t(3) as action clearly expressing that the speech of the robot R1 is not a speech in response to the user's speech.

Hereinafter, an example will be described as Specific Example 2 where the robot R1 itself clearly expresses that the robot R1 has failed the dialog or the robot R1 might possibly have failed the dialog.

Specific Example 2 t(1): User→R1, R2: "Recently, I went to see Lion King and found that children in children's roles did great performance."
t(2): R1→user: "They say female lions go hunting" (failed speech in reaction to "lion").

When the recognition result of the user's reaction to the speech t(2) of the robot R1 "is not a speech in response to the speech t(1) of the user (the robot R1 has failed the speech)," the robot R1 takes action of clearly expressing that "the speech of the robot R1 is not a speech in response to the user's speech."

Case 4:
t(3): R1→R2 "Listen! Did I say something strange?"
t(4): R2→user "Not that subject, but children in children's roles that we are talking about."
Case 5:
t(3): R1→user "Listen! Am I wrong?"
Case 6:
t(3): R1: Making a gesture with his head shaking In Case 4, the robot R1 expresses in the speech t(3) directed to the robot R2 that the robot R1 has caused the failed speech or the possibility that the robot R1 might have caused the failed speech. In Case 4, the robot R2 further utters a speech t(4) which is different from the speech t(2) to thereby continue the dialog in response to the user speech.

In Case 5, the robot R1 expresses in the speech t(3) as the speech directed to the user that the robot R1 has caused the failed speech or the possibility that the robot R1 might have caused the failure.

In Case 6, the one who has uttered the speech t(2) (robot R1 in this example) expresses that the robot R1 has caused the failed speech or the possibility that the robot R1 might have caused the failure through non-language communication t(3) as the speech directed to none (speech in response to neither the speech t(1) nor t(2) in this example) or as an expression of intention. In this example, the robot R2 makes a gesture of shaking its head as action to express that the speech of the robot R1 is not a speech in response to the user's speech.

Note that in this Case 5 or Case 6, since the robot R2 utters no speech, the dialog system may be configured to include only the robot R1. In other words, the dialog system can be established with only one robot.

An example has been shown in Case 4 of Specific Example 2 where the dialog system clearly expresses that the robot R1 has caused the failed speech or the possibility that the robot R1 might have caused the failure and then shows an example where the dialog is continued. Hereinafter, an example will be shown in Specific Example 3 where the dialog system continues the dialog without clearly expressing that the robot R1 has caused the failure in the dialog or the possibility that the robot R1 might have caused the failure. In Specific Example 3, in order to give the user an impression that the dialog system engages in the dialog by understanding contents of the dialog, the dialog system utters a speech different from the failed speech, and thereby continues the dialog in response to the user speech. More specifically, the dialog system continues the dialog in response to the user speech by uttering a speech with a topic changing word added or by causing a robot different from the robot that has caused the failed speech to utter a speech ignoring the failed speech.

Specific Example 3 t(1): User→R1, R2: "Recently, I went to see Lion King and found that children in children's roles did great performance."

t(2): R1→user: "They say female lions go hunting" (failed speech in reaction to "lion").

When the recognition result of the user's reaction to the speech t(2) of the robot R1 is that "the speech t(2) of the robot R1 is not a speech in response to the user's speech t(1) (the robot R1 has failed the speech)," the robot R1 and the robot R2 together continue the dialog without clearly expressing the failure.

Case 7:

t(3): R2→R1 "Well, I went to a Safari Park the other day and I saw a lion sleeping."

Case 8:

t(3): R2→user "Children in children's roles are cute."

In Case 7, the robot R2 utters the speech t(3), accompanied by the topic changing word, relating to the user's speech t(1) instead of the failed speech t(2) of the robot R1. By being accompanied by the topic changing word "well," while expressing that the dialog is deviated from the user's topic, the robot R2 can change the topic and continue the dialog, and can thereby give the user an impression that the robot R2 engages in the dialog by understanding contents of the dialog.

In Case 8, the robot R2 utters not the failed speech t(2) of the robot R1 but the speech t(3) relating to the user's speech t(1). By doing so, the robot R2 utters the speech t(3) by ignoring the speech t(2) of the robot R1, and the user utters a speech in response to the speech t(3), and can thereby continue the dialog and give the user an impression that the robot R2 engages in the dialog by understanding contents of the dialog.

Hereinafter, a configuration to implement the above-described processing will be described.

First Embodiment

Figure 2:
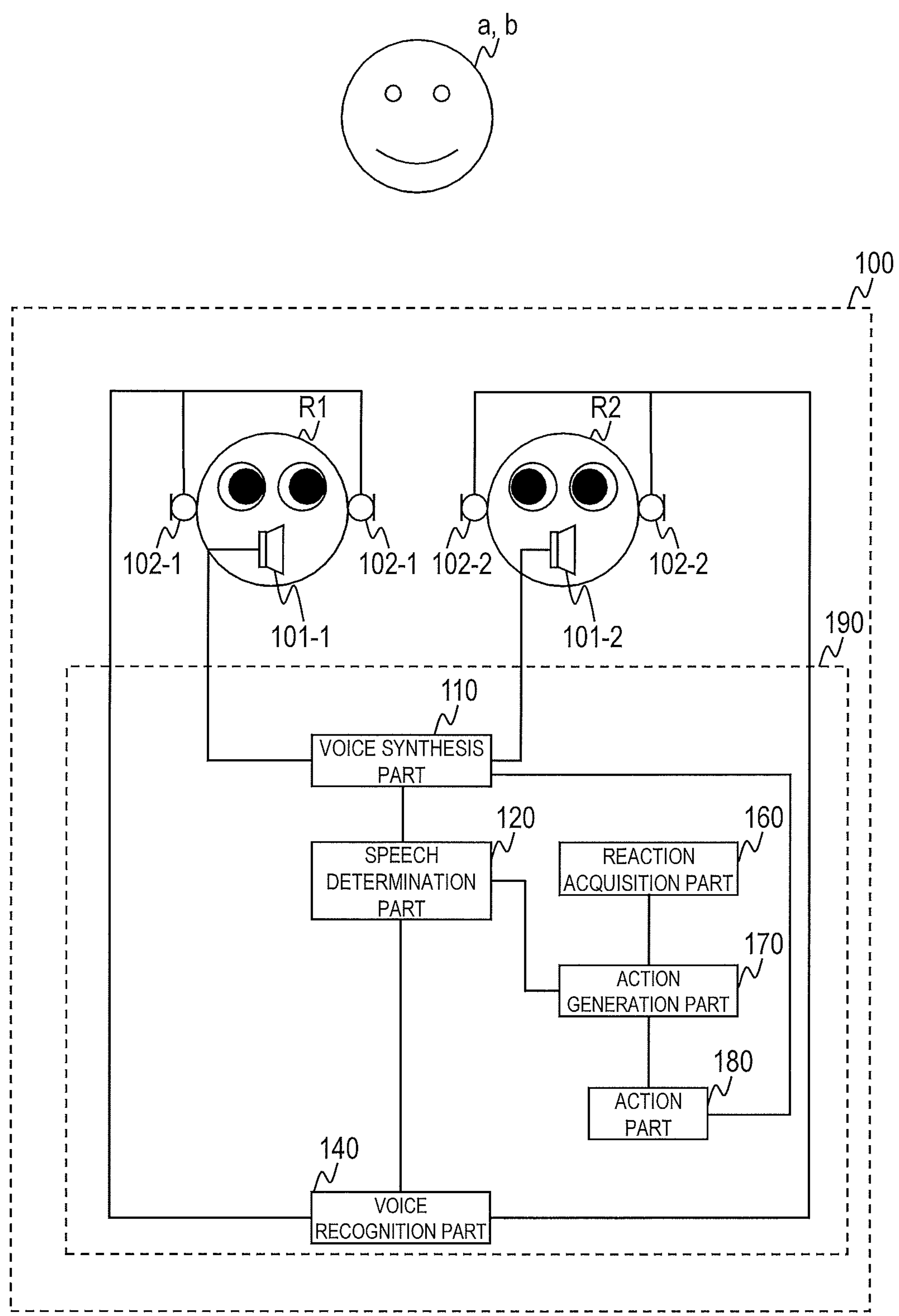
FIG. 2 is a functional block diagram of the dialog system according to the first embodiment.
Figure 3:
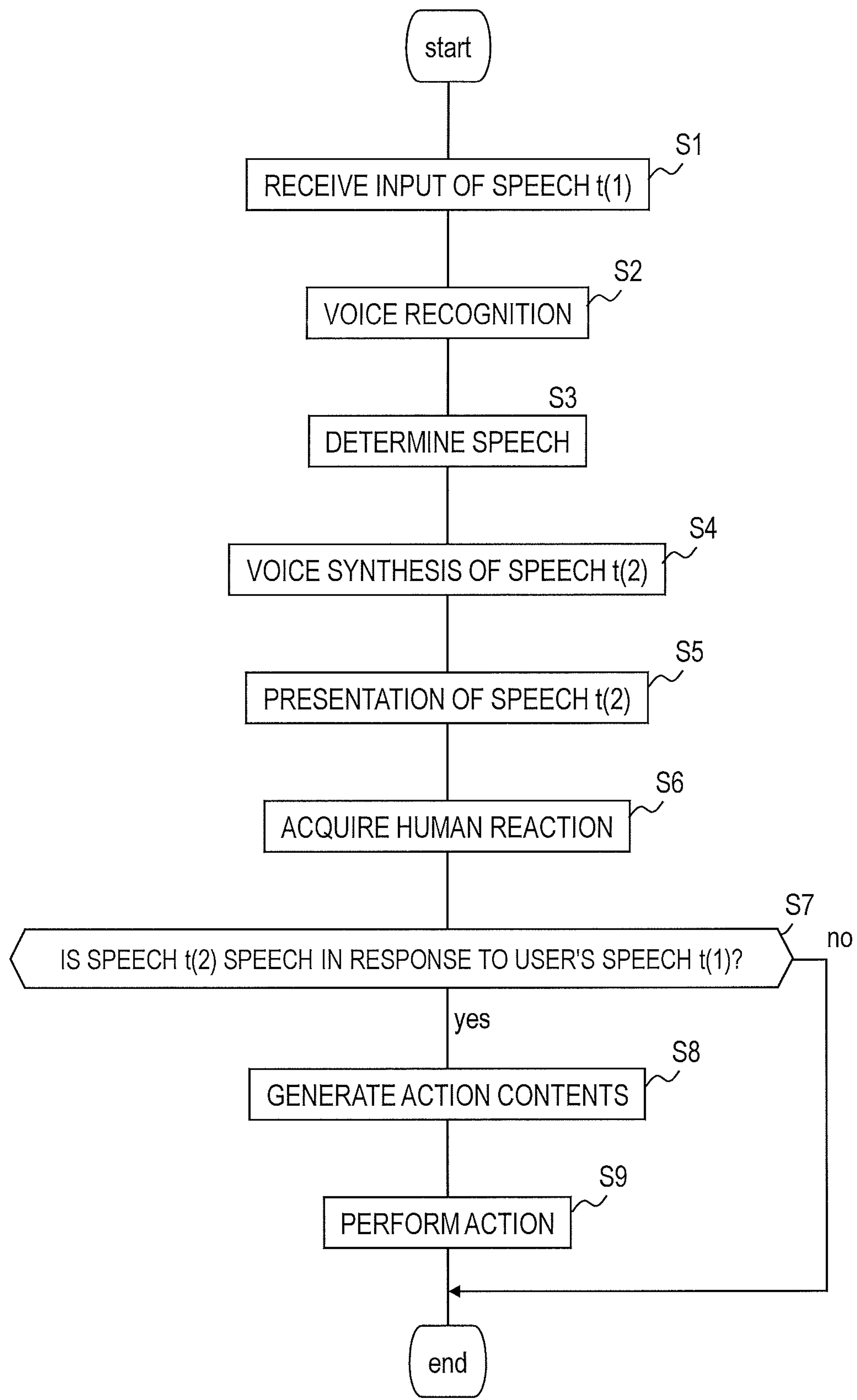
FIG. 3 is a diagram illustrating an example of a processing flow of the dialog system according to the first embodiment.

FIG. 2 illustrates a functional block diagram of a dialog system 100 according to a first embodiment and FIG. 3 illustrates a processing flow of the dialog system 100 according to the first embodiment.

The dialog system 100 includes robots R1 and R2, and a dialog apparatus 190. The dialog apparatus 190 includes a voice synthesis part 110, a speech determination part 120, a voice recognition part 140, a reaction acquisition part 160, an action generation part 170 and an action part 180. The robot R1 includes a presentation part 101-1 and an input part 102-1, and the robot R2 includes a presentation part 101-2 and an input part 102-2. The input parts 102-1 and 102-2 are configured to collect acoustic signals emitted from the periphery of the robots, and are, for example, microphones. The presentation parts 101-1 and 101-2 are configured to emit acoustic signals to the periphery of robots R1 and R2, and are, for example, speakers.

The dialog system 100 is intended for a human who is the user to have a dialog with the two robots R1 and R2, and for the robots R1 and R2 to utter speech voices generated by the dialog apparatus 190 in response to the speech of the human who is the user. Hereinafter, operations of the respective parts of the dialog system 100 will be described.

[Robots R1 and R2]

The robots R1 and R2 are intended to have a dialog with the user, are disposed near the user and utter speeches generated by the dialog apparatus 190.

[Input Parts 102-1 and 102-2]

The input parts 102-1 and 102-2 collect speech voices uttered by the user and output the collected voice data to the voice recognition part 140. Since the input part only has to be able to collect speech voices uttered by the user, any one of the input parts 102-1 and 102-2 may need not be provided. A configuration may also be adopted in which microphones set at places different from the robots R1 and R2, for example, in the vicinity of the user may be used as the input parts or none of the input parts 102-1 and 102-2 may be provided.

[Speech Recognition Part 140]

The voice recognition part 140 receives input of voice data obtained by the input parts 102-1 and 102-2 (a user's speech t(1), that is, a human speech t(1)) (S1), performs voice recognition on the voice data (S2), and outputs text of the recognition result to the speech determination part 120.

[Speech Determination Part 120]

Upon receiving the text of the voice recognition result in response to the user's speech t(1) from the voice recognition part 140, the speech determination part 120 determines the text of the speech t(2), which is presented by the dialog system 100 after the user speech t(1), based on at least the text of the voice recognition result in response to the user's speech t(1), that is, the human speech t(1) and outputs the text to the voice synthesis part 110 (S3). Note that the robot that utters the speech may also be determined, and in this case, information indicating the robot that utters the speech is also outputted to the voice synthesis part 110.

Note that the speech determination part 120 is internally provided with a dialog system that generates and outputs text of speech according to a rule described in advance using words included in the text of the speech inputted as a trigger as in the case of the dialog system called an "idle talk dialog system" described in Reference Literature 3, for example. The dialog system provided in the speech determination part 120 generates and outputs text of speech based on at least the text of the voice recognition result corresponding to the user's speech.

(Reference Literature 3) Hiroaki Sugiyama, Toyomi Meguro, Ryuichiro Higashinaka, Yasuhiro Minami, "Generation of Response Statement using Dependency and Examples with Respect to User Speech with Arbitrary Topics" Japanese Society for Artificial Intelligence, Journal, vol. 30(1), pp. 183-194, 2015

Alternatively, the speech determination part 120 is internally provided with a dialog system that selects and outputs, when the inputted speech text corresponds to a choice of a scenario stored in advance in the dialog system, text of the speech stored in advance in correspondence with the choice, as in the case of, for example, a dialog system called a "scenario dialog system" described in Reference Literature 4. The dialog system concerned provided in the speech determination part 120 selects and outputs text of a speech based on at least the text of the voice recognition result in response to the user's speech from the text stored in advance. (Reference Literature 4) Yasuhiro Arimoto, Yuichiro Yoshikawa, Hiroshi Ishiguro, "Impression Evaluation of Dialog without Voice Recognition by Plural Robots," Conference of the Robotics Society of Japan, 2016

[Voice Synthesis Part 110]

The voice synthesis part 110 performs voice synthesis on text (text of speech t(2)) inputted from the speech determination part 120 (S4), obtains synthesized voice data, and outputs the synthesized voice data obtained to the presentation part 101-1 of the robot R1 or the presentation part 101-2 of the robot R2. When the text and information indicating the robot that utters a speech of the text concerned are received from the speech determination part 120 together with the text, the voice synthesis part 110 outputs the synthesized voice data to the presentation part of the robot corresponding to the information.

[Presentation Parts 101-1 and 101-2]

The presentation parts 101-1 and 101-2 play voices corresponding to the synthesized voice data inputted from the voice synthesis part 110 (synthesized voice data of the speech t(2)) (S5). This causes the user to hear a speech of the robot R1 or R2, and a dialog between the user and the dialog system 100 is thereby implemented.

[Reaction Acquisition Part 160 and Action Generation part 170] The reaction acquisition part 160 acquires a human reaction to the second speech t(2) (S6), and outputs the human reaction to the action generation part 170.

The action generation part 170 receives the human reaction to the second speech t(2) inputted from the reaction acquisition part 160 and determines, based on the reaction, whether or not the speech t(2) is a speech in response to the user's speech t(1), that is, the human speech t(1) (S7).

For example, in order to determine whether or not the speech t(2) is a speech in response to the user's speech t(1), the action generation part 170 utilizes a change in the user's facial expression or the like or feedback speech (speech expressing an impression concerning the system speech consciously or unconsciously such as a sigh or speech like "Different"). As an example, a method for utilizing a change in facial expression will be illustrated. The reaction acquisition part 160 includes a camera and acquires time-series images of the user's face. The reaction acquisition part 160 acquires features (for example, size of the pupil, position of the outer canthus, position of the inner canthus, position of the angle of mouth, degree of opening of the mouth) from the acquired time-series images. Changes in these features correspond to a human reaction. Prior to the use of the dialog system 100, a target person is caused to hear a failed speech and changes in features before and after the failed speech are stored in a storage part (not shown) in the action generation part 170. Note that the target person means a person from whom a pattern of changes in features is acquired and may be the user of the dialog system 100 or else. The action generation part 170 calculates similarity between a change in features stored in the storage part (not shown) in the action generation part 170 and a human reaction (change in features) acquired in S6 and inputted from the reaction acquisition part 160. The action generation part 170 determines whether or not the two are similar based on a magnitude relationship between the similarity and a predetermined threshold stored in a storage part (not shown) in the action generation part 170. When the action generation part 170 determines that the two are similar, the action generation part 170 determines that the speech t(2) is not a speech in response to the user's speech t(1). For example, when indicating that a higher similarity level corresponds to the fact that the two are more similar, the action generation part 170 determines that the two are similar when the similarity level is greater than a predetermined threshold and determines that the speech t(2) is not a speech in response to the user's speech t(1). On the other hand, when feedback speech is used, the input parts 102-1 and 102-2 collect voices of the feedback speech uttered by the user and output the collected voice data to the voice recognition part 140. The voice recognition part 140 receives input of the voice data (feedback speech) obtained by the input parts 102-1 and 102-2, performs voice recognition on the voice data and outputs text of the recognition result to the action generation part 170. Upon receiving the text of the recognition result of the feedback speech, the action generation part 170 determines whether or not the system speech t(2) is a speech in response to the user's speech t(1) using, for example, the method used in Reference Literature 5. Note that Reference Literature 5 estimates an evaluation value as to whether or not the system speech t(2) is a speech in response to the user's speech t(1) using Ngram of words included in the text of the recognition result of the feedback speech, a frequency of word class, positive or negative of an emotion polarity and the magnitude thereof. For example, the action generation part 170 determines whether the system speech t(2) is a speech in response to the user's speech t(1) based on a magnitude relationship between the evaluation value and a threshold. (Reference Literature 5) Masahiro Mizunoue, et al. "Example Based Dialog System Based on Amenity Estimation", Japanese Society for Artificial Intelligence, Journal, Vol. 31, No. 1, 2016.

Hereinafter, processing contents will be described according to Specific Examples.

(Cases with Specific Examples 1 and 2)

When a human reaction is a reaction indicating that the speech t(2) is not a speech in response to the user's speech t(1), that is, the human speech t(1), the action generation part 170 generates, that is, determines (S8) action contents which are contents of the action to express that the speech t(2) is not a speech in response to the user's speech t(1), that is, the human speech t(1), and outputs the contents of the action to the action part 180.

When the human reaction is not the reaction indicating that the speech t(2) is not a speech in response to the user's speech t(1) (in other words, the human reaction is a reaction indicating that the speech t(2) is a speech in response to the user's speech t(1)), the dialog may be continued using a conventional dialog system (e.g., see non-patent literature 2). Here, description of the process is omitted.

When the human reaction is a reaction indicating that the speech t(2) is not a speech in response to the user's speech t(1), that is, the speech t(2) is not in response to the human speech t(1), the action part 180 receives the action contents generated by the action generation part 170 and takes the action with the action contents (S9).

The action contents are contents showing the subject of action, a target of action, action itself or the like. However, in the case of action not requiring any target, the target of the action may be omitted. Examples of the subject of the action may include the robot R1 and the robot R2 in the present embodiment. Examples of the target of the action may include the robot R1, the robot R2 and the user. Examples of the action itself may include language communication (=speech) and non-language communication. "Language communication" targets at all types of communication using words and need not always be accompanied by voices. "Non-language communication" refers to communication by means other than words and examples of non-language communication include facial expression, countenance, glance, gestures, and body posture.

Examples of language communication expressing that the speech t(2) is not in response to the user's speech t(1), that is, the human speech t(1) may include "What are you saying," "I wonder what he tries to say," "Listen! Did I say something strange?" or "Listen! Am I wrong?" of the speech t(3) in Case 1, Case 2, Case 4 and Case 5 (see FIG. 1).

Examples of non-language communication expressing that the speech t(2) is not a speech in response to the user's speech t(1), that is, the human speech t(1) may include the sighing operation, the gesture of shaking one's head in t(3) in Case 3 and Case 6.

Note that these are merely examples, and such communication may be other language communication or non-language communication if the communication is action expressing that the speech t(2) is not a speech in response to the user's speech t(1), that is, the human speech t(1).

In the case of Case 1, Case 2, Case 4 or Case 5, the action generation part 170 outputs a control signal to the speech determination part 120, causes the speech determination part 120 to perform the following operation and thereby generates action contents. The action part 180 outputs a control signal to the voice synthesis part 110, causes the voice synthesis part 110 to perform the following operation and thereby performs action with the action contents.

The speech determination part 120 receives the control signal from the action generation part 170, generates text of the speech t(3) in any one of Case 1, Case 2, Case 4 and Case 5 using the dialog system provided in the speech determination part 120 or selects from texts stored in advance in the dialog system provided in the speech determination part 120 and outputs the text to the voice synthesis part 110.

The voice synthesis part 110 receives the control signal from the action part 180, receives the text of the speech t(3) outputted from the speech determination part 120 as input, performs voice synthesis on the text of the speech t(3), obtains synthesized voice data and outputs the synthesized voice data obtained to the presentation part 101-1 of the robot R1 (for Case 4 or Case 5) or the presentation part 101-2 of the robot R2 (for Case 1 or Case 2). The presentation part 101-1 or the presentation part 101-2 plays synthesized voice data corresponding to the text of the speech t(3) inputted from the voice synthesis part 110 and presents the speech t(3).

In Case 1 or Case 4, the speech determination part 120 further generates text of the speech t(4) in any one of Case 1 and Case 4 using the dialog system provided in the speech determination part 120 or selects the text stored in advance in the dialog system provided in the speech determination part 120 and outputs the text to the voice synthesis part 110. The voice synthesis part 110 performs voice synthesis on the text of the speech t(4) to obtain synthesized voice data and outputs the synthesized voice data obtained to the presentation part 101-1 of the robot R1 (for Case 1) or the presentation part 101-2 of the robot R2 (for Case 4). The presentation part 101-1 or the presentation part 101-2 plays synthesized voice data corresponding to the text of the speech t(4) inputted from the voice synthesis part 110 and presents the speech t(4).

In the case of Case 3, for example, the action part 180 extracts synthesized voice data corresponding to the sigh stored in advance in the dialog system provided in the speech determination part 120 and outputs the synthesized voice data corresponding to the sigh to the presentation part 101-2 of the robot R2. The presentation part 101-2 plays the synthesized voice data of the sigh and presents the non-language communication t(3) (operation of giving a sigh). In this case, suppose that the dialog system provided in the speech determination part 120 stores the synthesized voice data corresponding to the sigh. The dialog system may be configured to have a mode in which (i) the dialog system provided in the speech determination part 120 stores text corresponding to the sigh in advance, (ii) the speech determination part 120 selects the text corresponding to the sigh, outputs the text to the voice synthesis part 110, (iii) the voice synthesis part 110 performs voice synthesis on the text corresponding to the sigh to obtain synthesized voice data, outputs the synthesized voice data obtained to the presentation part 101-2 of the robot R2, and (iv) the presentation part 101-2 plays a voice corresponding to the synthesized voice data of the sigh inputted from the voice synthesis part 110 and presents non-language communication t(3) (operation of giving a sigh).

In the case of Case 6, for example, the action part 180 outputs a control signal to a motor (not shown), causes the robot R1 to make a gesture of shaking its head and presents non-language communication t(3) (a gesture of shaking its head). In this case, the robot R1 is provided with a motor or the like to make a gesture of shaking its head.

(Case with Specific Example 3)

When the human reaction is a reaction expressing that the speech t(2) is not a speech in response to user's speech t(1), that is, the human speech t(1), the action generation part 170 generates, that is, determines (S8) the speech t(3) which is different from the speech t(2) and outputs the speech t(3) to the action part 180.

When the human reaction is a reaction expressing that the speech t(2) is not a speech in response to the user's speech t(1), that is, the human speech t(1), the action part 180 receives the action contents generated by the action generation part 170 and performs action with the action contents (S9).

The speech t(3) different from the speech t(2) may be the speech of t(3), for example, in Case 7 or Case 8 "Well, I went to a Safari Park the other day and I saw a lion sleeping," "Children in children's roles are cute" (see FIG. 1). Furthermore, the speech of t(4) in Case 4 of Specific Example 2: "Not that subject, but children in children's roles that we are talking about." may also be said to be an example of the speech different from the speech t(2).

The speech t(3) in Case 7 is a speech different from the speech t(2), and more specifically, is a speech different from the speech t(2) of the robot R1 "They say female lions go hunting". Furthermore, the speech t(3) in Case 7 is a speech preceded by a topic changing word (word used to change a topic) "Oh, by the way." In Case 7, a topic changing word is used for the speech t(3) of the robot R2 to show the user that the speech t(2) of the robot R1 is not a speech in response to the user's speech t(1) "Recently, I went to see Lion King and found that children in children's roles did great performance" and a change of topic (that the topic is changed to at least a topic that has nothing to do with the speech t(2) of the robot R1) is shown to the user. In this way, the user can continue the dialog by uttering a speech in response to the speech t(3).

The speech t(3) in Case 8 is a speech different from the speech t(2), and more specifically, is a speech different from the speech t(2) of the robot R1 "They say female lions go hunting". Furthermore, the speech t(3) in Case 8 is a speech uttered by the robot R2 which is a robot different from the robot R1 that has uttered the speech t(2). In Case 8, the robot R2 different from the robot R1 that has uttered the failed speech is caused to utter the speech t(3), and the user can continue the dialog by uttering a speech in response to the speech t(3).

The speech t(4) in Case 4 is a speech different from the speech t(2), and more specifically, is a speech different from the speech t(2) of the robot R1 "They say female lions go hunting". Furthermore, the speech t(4) is a speech uttered by the robot R2 after the robot R1 expresses in the speech t(3) that the robot R1 has failed the dialog in the speech t(2) or the possibility that the robot R1 might have failed the dialog. In other words, in Case 4, the speech t(3) expressing that the speech t(2) is not a speech in response to the user's speech t(1) is presented first rather than presenting the speech t(4) different from the speech t(2). In Case 4, the user utters a speech in response to the speech t(4) that is not a speech in response to the speech t(2) expressed to be the failed speech, and can thereby continue the dialog.

For example, in the case of Case 7 or Case 8, the action generation part 170 outputs a control signal to the speech determination part 120, causes the speech determination part 120 to perform the following operation and thereby generates action contents. The action part 180 causes the voice synthesis part 110 and the presentation parts 101-1 and 101-2 to perform the following operation and thereby performs action with the action contents.

The speech determination part 120 receives the control signal from the action generation part 170, generates text corresponding to the speech t(3) in any one of Case 7 and Case 8 using the dialog system provided in the speech determination part 120 or selects the text from among texts stored in advance in the dialog system provided in the speech determination part 120 and outputs the text to the voice synthesis part 110.

The voice synthesis part 110 receives a control signal from the action part 180, receives the text of the speech t(3) outputted from the speech determination part 120 as input, performs voice synthesis on the text corresponding to the speech t(3) to obtain synthesized voice data and outputs the synthesized voice data obtained to the presentation part 101-2 of the robot R2. The presentation part 101-2 plays the synthesized voice data corresponding to the text of the speech t(3) inputted from the voice synthesis part 110 and presents the speech t(3).

Hereinafter, a process of determining a speech different from the speech t(2) will be described.

First, as a speech different from the speech t(2), that is, as the speech t(3) in Case 7 or the speech t(3) in Case 8 or the speech t(4) in Case 4, an example of a process of determining a speech candidate different from the speech t(2) among a plurality of speech candidates estimated to be appropriate for the user's speech t(1) will be described.

As the speech t(3) in Case 7 or the speech t(3) in Case 8 or the speech t(4) in Case 4, the process of determining a speech candidate different from the speech t(2) among the plurality of speech candidates estimated to be appropriate for the user's speech t(1) is a process of determining a speech estimated to be the most appropriate next to the speech t(2) as the speech in response to the user's speech t(1). Hereinafter, the process of the speech determination part 120 to determine the speech t(3) in Case 8 will be described as an example. The process of the speech determination part 120 to determine the speech t(3) in Case 7 or the speech t(4) in Case 4 is similar to the process of the speech determination part 120 to determine the speech t(3) in Case 8.

In this example, the speech determination part 120 generates a plurality of texts (speech candidate texts) of the speech estimated to be appropriate for the text of the user's speech t(1) and obtains one speech candidate text among them as the text of the speech t(2). For example, the speech determination part 120 obtains the speech candidate text estimated as the most appropriate among the plurality of speech candidate texts generated as the text of the speech t(2). Furthermore, the speech determination part 120 assumes one speech candidate text different from the text of the speech t(2) as the text of the speech t(3) in Case 8 among the plurality of speech candidate texts. For example, the speech determination part 120 assumes the speech candidate text estimated as the most appropriate next to the text of the speech t(2) as the text of the speech t(3) in Case 8 among the plurality of speech candidate texts.

At this time, when the text of the speech t(2) is similar to the speech t(3) in Case 8, not only the text of the speech t(2) but also the text of the speech t(3) in Case 8 is likely to become a failed speech. Therefore, when three or more speech candidate texts are generated, the speech determination part 120 preferentially selects a speech candidate text with a lower similarity to the text of the speech t(2) as the text of the speech t(3) in Case 8 among the two or more speech candidate texts except the text of the speech t(2) of three or more speech candidate texts generated. In other words, when three or more speech candidate texts are generated, the speech determination part 120 selects a speech candidate text as the text of the speech t(3) in Case 8 and the selected speech candidate text is a speech candidate text other than the speech candidate text with the highest similarity to the text of the speech t(2) of the two or more speech candidate texts except the text of the speech t(2) among the three or more speech candidate texts generated.

The process of selecting the speech candidate text with a low similarity to the text of the speech t(2) as text of the speech t(3) in Case 8 is implemented, for example, as follows. The speech determination part 120 first generates three or more speech candidate texts estimated to be appropriate for the user's speech t(1) using a conventional dialog system. When speech candidate texts are expressed as $t_1$, $t_2$, . . . starting from one estimated to be the most appropriate speech candidate text, the speech determination part 120 obtains one speech candidate text from among the three or more speech candidate texts $t_1$, $t_2$, . . . as the text of the speech t(2). For example, the speech determination part 120 assumes the speech candidate text $t_1$ estimated to be the most appropriate one as the text of the speech t(2). The speech determination part 120 then calculates similarities between the speech candidate text obtained as the text of the speech t(2) and the other speech candidate texts respectively. For example, when the speech determination part 120 assumes the speech candidate text $t_1$ estimated to be the most appropriate text as the text of the speech t(2), the speech determination part 120 calculates similarities between the speech candidate text $t_1$ and the speech candidate texts $t_2$, $t_3$, . . . respectively. For example, the speech determination part 120 calculates, using sentences themselves or words of the text of the speech t(2) and those of the other speech candidate texts, (a) distance between topic words using word2vec, (b) a distance between sentences when words in a whole sentence are averaged by word2vec and (c) cos similarity of words or the like. The speech determination part 120 obtains a speech candidate text as the text of the speech t(3) and the obtained speech candidate text is a speech candidate text other than the speech candidate text with the highest similarity to the text of the speech t(2) among the plurality of speech candidate texts not selected as texts of the speech t(2). Using such a method, the speech t(3) in Case 8 is selected from among speech candidates other than the speech candidate most similar to the speech t(2) which are the plurality of speech candidates generated using the conventional dialog system.

In the stage of generating the speech candidate texts $t_1$, $t_2$, . . . in the first place, the speech determination part 120 may generate a plurality of speech candidate texts so that each speech candidate text $t_1$, $t_2$, . . . corresponds to the text of the user's speech t(1) and similarity between speech candidate texts becomes lower. By adopting such a configuration for the speech determination part 120, the speech t(2) and the speech t(3) in Case 8 become speeches not similar to each other. When the speech determination part 120 selects a word to be a topic of the speech, the configuration can be implemented by simultaneously taking into consideration not only an index indicating words with a high similarity to the topic of the user's speech t(1) but also a standard of words with low similarity among a plurality of topic words, and generating the speech candidate text of the speech t(2) from the selected topic word group. For example, when the speech determination part 120 has a pool (type) of words to be a topic of the speech having a total of 20 words and generates the speech candidate text of the speech t(2) of the dialog system from 5 words thereof, the speech determination part 120 may perform operation of subtracting the sum total of similarities among the selected 5 topic words (${}_5C_2$=10 ways) from the sum total of similarities among the selected 5 topic words and the user topic. Note that when the speech determination part 120 generates a speech candidate text using an idle talk dialog system, the speech determination part 120 can generate the speech candidate text from arbitrary words, and so the pool of words becomes enormous, and the number of combinations when selecting 5 from the pool also becomes enormous. Therefore, the speech determination part 120 may employ a method whereby the 20 words to be selected from the pool of words may be 20 words with a higher similarity to the text of the user speech and the speech determination part 120 may calculate in the flow similar to the above-described flow.

Furthermore, there can be a case where the speech t(3) in Case 8 determined in this way is not a speech in response to the user's speech t(1). In such a case, the speech determination part 120 preferentially selects a speech candidate text with a low similarity to the text of the speech t(2) and the text of the speech t(3) in Case 8 as the system speech next to the speech t(3) in Case 8. In this way, it is possible to implement system speech which is less likely to become a failed speech.

Next, as a speech different from the speech t(2), that is, as the speech t(3) in Case 7, the speech t(3) in Case 8 and the speech t(4) in Case 4, an example of a process of selecting a speech of a topic different from the speech t(2) will be described.

The speech determination part 120 stores in advance, scenarios corresponding to a plurality of topics as a dialog system called a "scenario dialog system" described, for example, in Reference Literature 4 and a plurality of speech texts corresponding to the respective scenarios. The speech determination part 120 selects texts of speech corresponding to scenarios of topics different from the scenario in which the text of the speech t(2) selected by the speech determination part 120 is included as the speech t(3) in Case 7, the speech t(3) in Case 8 or the speech t(4) in Case 4.

Note that as a speech different from the speech t(2), that is, as the speech t(3) in Case 7, the speech t(3) in Case 8 or the speech t(4) in Case 4, a speech of a topic different from the speech t(2) may be generated by a dialog system called an "idle talk dialog system" described, for example, in Reference Literature 3.

Note that these are, however, merely examples and t(3) in Case 7, t(3) in Case 8 or t(4) in Case 4 may be other language communication or non-language communication if they are actions different from speech t(2).

<Effects>

Such a configuration can give the user an impression that the system engages in the dialog by understanding contents of the dialog.

<Modification 1>

In the first embodiment, a dialog system including two robots has been described. However, as described above, there is also a mode in which the speech determination part 120 may not determine any robot that utters a speech. Therefore, there is also a mode in which the dialog system 100 does not always require two robots. When this mode is adopted, the number of robots included in the dialog system 100 may be one. Furthermore, as described above, there is a mode in which the speech determination part 120 determines two robots as the robots that utter speeches. This mode may be operated in the configuration in which three or more robots are included in the dialog system 100.

<Modification 2>

In the configuration in which the dialog system 100 includes a plurality of robots, the number of presentation parts need not be the same as the number of robots if the user is allowed to determine which robot utters a speech. The presentation part need not be set in the robot. The method that allows the user to determine which robot utters a speech may be to use known techniques such as differentiating voice quality of voices to be synthesized from one robot to another or differentiating orientation from one robot to another using a plurality of speakers.

<Modification 3>

An example has been described in the aforementioned embodiment where robots are used as agents and a dialog is performed with voices. However, the robots in the aforementioned embodiment may be humanoid robots having physical bodies or the like or robots without physical bodies. The dialog technique of the invention is not limited to the above-described techniques, but may be a mode in which a dialog is performed using agents without any entity like a physical body as a humanoid robot, not provided with any utterance mechanism. One such example may be a mode in which a dialog is performed using an agent displayed on a screen of a computer. More specifically, in group chats in which a plurality of accounts perform dialogs using text messages such as "LINE" and "2-channel (registered trademark)", the present dialog system is applicable to a mode in which a dialog is performed between the user's account and an account of a dialog apparatus. In this mode, the computer having a screen displaying agents needs to be located in the vicinity of a human, but the computer and the dialog apparatus may be connected together via a network such as the Internet. That is, the present dialog system is applicable not only to a dialog in which speakers such as a human and a robot speak face to face, but also to a dialogue in which speakers communicate with each other through a network.

Figure 4:
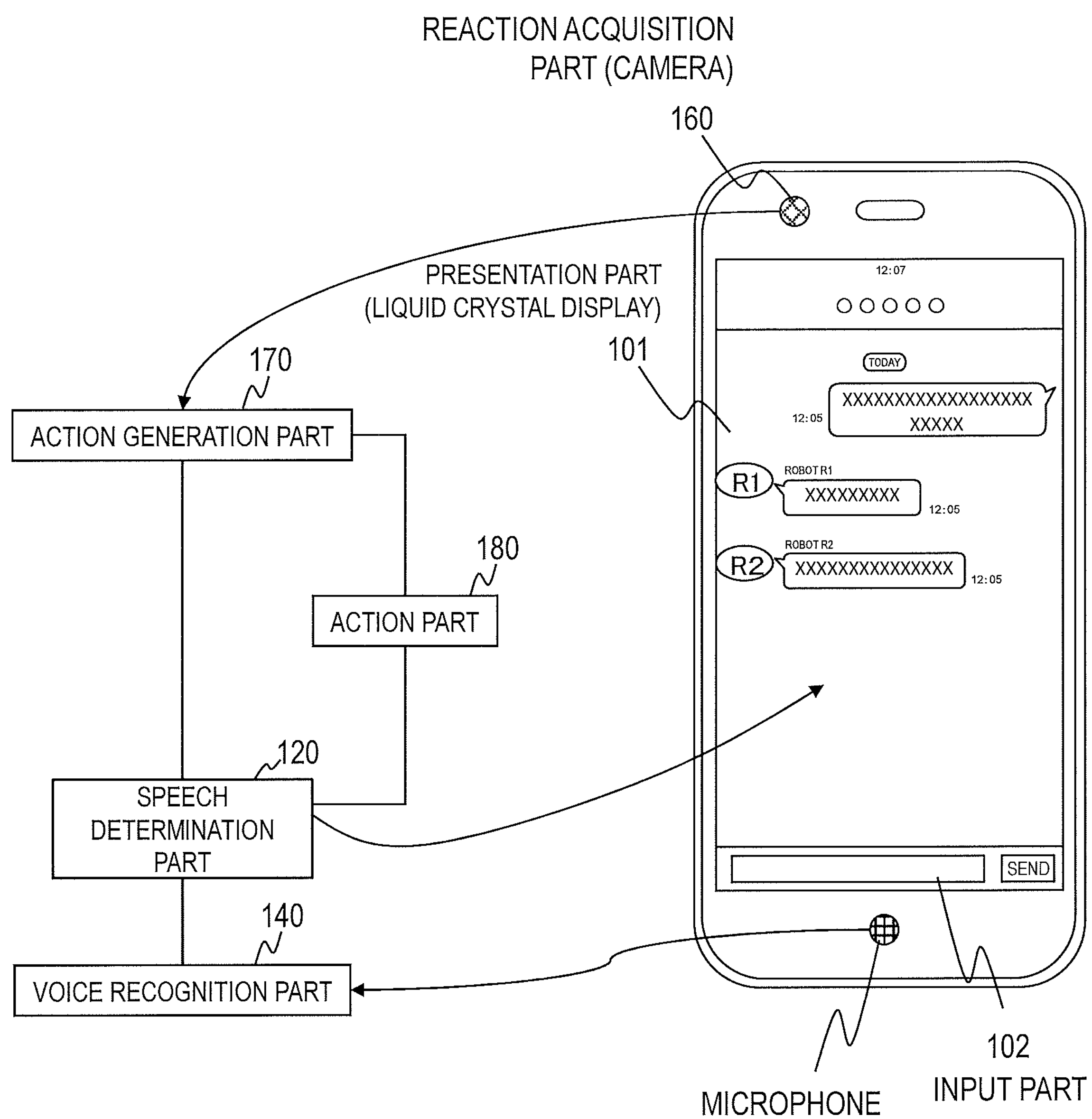
FIG. 4 is a diagram illustrating a dialog system according to modification 3.

As shown in FIG. 4, a dialog apparatus according to the modification is provided with an input part 102, a speech determination part 120, a reaction acquisition part 160, an action generation part 170, an action part 180 and a presentation part 101. The speech determination part 120 may be provided with an interface that allows communication with an information processing apparatus existing outside and may configure a processing part having part of each part or similar functions in an information processing apparatus existing outside the dialog apparatus.

Examples of the dialog apparatus according to the modification include a mobile terminal such as smartphone and a tablet or an information processing apparatus such as desktop or lap top personal computer. The following description is given assuming that the dialog apparatus is a smartphone. The reaction acquisition part 160 includes a camera provided for the smartphone, acquires time-series images of the user's face and acquires changes in features from the acquired time-series images. The presentation part 101 is a liquid crystal display provided for the smartphone. A window of chat application is displayed on this liquid crystal display and dialog contents of the group chat are displayed in the window in time-series order. The "group chat" is a function whereby a plurality of accounts in a chat mutually contribute text messages and develop a dialog. Suppose a plurality of virtual accounts corresponding to virtual characters controlled by the dialog apparatus and the user's account participate in this group chat. That is, the present modification is an example of a case where the agent is a virtual account displayed on the liquid crystal display of the smartphone which is the dialog apparatus. The user enters speech contents into the input part 102 using a software keyboard and can contribute the speech contents to the group chat through the own account. The speech determination part 120 enters the contribution from the user's account into an idle talk dialog system or a scenario dialog system provided in the speech determination part 120 and contributes the speech contents obtained from each dialog system to the group chat through each virtual account. Note that the dialog apparatus according to the modification does not include any voice synthesis part. Therefore, the speech determination part 120 receives control signals from the action generation part 170 and the action part 180, selects the text generated by the dialog system provided in the speech determination part 120 or the text stored in advance in the dialog system provided in the speech determination part 120 and outputs the text to the presentation part 101. The presentation part 101 displays the text of the speech inputted from the speech determination part 120 and presents the speech.

Note that a configuration may also be adopted in which the user enters the speech contents into the input part 102 by means of a speech using a microphone and the voice recognition function mounted on the smartphone. Furthermore, a configuration may also be adopted in which speech contents obtained from each dialog system using a speaker and the voice synthesis function mounted on the smartphone are outputted in voice corresponding to each virtual account from the speaker.

Note that when speeches of the agents are displayed on the presentation part 101 (display) simultaneously, they may cause the user to feel a feeling of strangeness, and so the speeches are preferably displayed one by one.

<Other Modification>

The present invention is not limited to the above-described embodiment and modifications. For example, the above-described various processes other than the speech sequence presented by the presentation part may not only be executed in time-series order according to the description, but also be executed in parallel or individually according to a processing capacity of the apparatus that executes the processes or as required. In addition, the present invention can be changed as appropriate without departing from the spirit and scope of the present invention.

<Program and Recording Medium>

The various processing functions of the respective apparatuses described in the above-described embodiment and modifications 1 and 2 may be implemented by a computer. In that case, processing contents of the functions that should be possessed by the respective apparatuses are described by a program. Furthermore, the various processing functions of the dialog system described in the above-described modification 3 may be implemented by a computer. In that case, the processing contents that should be possessed by the dialog system are described by a program. The various processing functions of the respective apparatuses are implemented on the computer by the computer executing this program.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated through, for example, sales, transfer or rent of a portable recording medium such as DVD, CD-ROM that records the program. The program may also be circulated by storing the program in a storage apparatus of a server computer, and transferring the program from the server computer to another computer.

The computer that executes such a program temporarily stores a program recorded in a portable storage medium or a program transferred from the server computer in the own storage part. At the time of execution of the process, this computer reads the program stored in the own storage part and executes the process according to the read program. As another embodiment of the program, the computer may read the program directly from a portable recording medium and may execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program includes a semi-program which is information used for processing by a computer (data which is not a direct instruction on the computer but has a characteristic of defining processing of the computer).

Although each apparatus is configured by executing a predetermined program on the computer, at least some of these processing contents may be implemented by hardware.

What is claimed is:

1. A dialog method performed by a dialog system, the dialog system comprising a first agent and a second agent different from the first agent, the dialog method comprising:

a speech receiving step in which the dialog system receives input of a speech of a human;

a first speech determination step in which the dialog system determines a first speech which is a speech in response to the speech of the human;

a first speech presentation step in which the first speech is presented by the first agent;

a reaction acquisition step in which the dialog system acquires a reaction of the human to the first speech;

a second speech determination step in which the dialog system determines, in a case that the reaction of the human is a reaction indicating that the first speech is not a speech in response to the speech of the human, a second speech which is a speech different from the first speech; and a second speech presentation step in which the second speech is presented by the second agent, wherein the second speech is (A) a speech which expresses that the first speech has caused a failed speech or suggests a possibility that the first speech might have caused a failed speech or (B) a speech which is accompanied by a topic changing word and relates to the speech of the human instead of the first speech, in the first speech determination step, a plurality of candidate speeches which are speech candidates for the speech of the human are generated and one of the plurality of candidate speeches is obtained as the first speech, in the second speech determination step, one candidate speech which is different from the first speech is obtained as the second speech from among the plurality of candidate speeches generated in the first speech determination step, in the first speech determination step, three or more candidate speeches are generated, in the second speech determination step, similarities between the first speech and a plurality of candidate speeches, which are different from the first speech, are calculated, and a candidate speech other than a candidate speech having the highest similarity compared with the first speech among the plurality of candidate speeches, which are different from the first speech, among the plurality of candidate speeches generated in the first speech determination step is obtained as the second speech, and in the first speech determination step, each of the candidate speeches is a speech in response to the speech of the human and the plurality of candidate speeches are generated so that similarity between the plurality of candidate speeches is lowered.

2. A dialog system comprising:

a speech receiving part that receives input of a speech of a human;

a first speech determination part that determines a first speech which is a speech in response to the speech of the human;

a first agent that presents the first speech;

a reaction acquisition part that acquires a reaction of the human to the first speech;

a second speech determination part that determines, in a case that the reaction of the human is a reaction indicating that the first speech is not a speech in response to the speech of the human, a second speech which is a speech different from the first speech; and a second agent that is different from the first agent and presents the second speech, wherein the second speech is (A) a speech which expresses that the first speech has caused a failed speech or suggests a possibility that the first speech might have caused a failed speech or (B) a speech which is accompanied by a topic changing word and relates to the speech of the human instead of the first speech, in the first speech determination part, a plurality of candidate speeches which are speech candidates for the speech of the human are generated and one of the plurality of candidate speeches is obtained as the first speech, in the second speech determination part, one candidate speech which is different from the first speech is obtained as the second speech from among the plurality of candidate speeches generated in the first speech determination part, in the first speech determination part, three or more candidate speeches are generated, in the second speech determination part, similarities between the first speech and a plurality of candidate speeches, which are different from the first speech, are calculated, and a candidate speech other than a candidate speech having the highest similarity compared with the first speech among the plurality of candidate speeches, which are different from the first speech, among the plurality of candidate speeches generated in the first speech determination part is obtained as the second speech, and in the first speech determination part, each of the candidate speeches is a speech in response to the speech of the human and the plurality of candidate speeches are generated so that similarity between the plurality of candidate speeches is lowered.

3. A dialog apparatus comprising:

a first speech determination part that determines a first speech which is a speech in response to an inputted a speech of a human and is a speech presented by a first agent; and a second speech determination part that determines, in a case that a reaction of the human to the first speech is a reaction indicating that the first speech is not a speech in response to the speech of the human, a second speech which is a speech different from the first speech and is a speech presented by a second agent different from the first agent, wherein the second speech is (A) a speech which expresses that the first speech has caused a failed speech or suggests a possibility that the first speech might have caused a failed speech or (B) a speech which is accompanied by a topic changing word and relates to the speech of the human instead of the first speech, in the first speech determination part, a plurality of candidate speeches which are speech candidates for the speech of the human are generated and one of the plurality of candidate speeches is obtained as the first speech, in the second speech determination part, one candidate speech which is different from the first speech is obtained as the second speech from among the plurality of candidate speeches generated in the first speech determination part, in the first speech determination part, three or more candidate speeches are generated, in the second speech determination part, similarities between the first speech and a plurality of candidate speeches, which are different from the first speech, are calculated, and a candidate speech other than a candidate speech having the highest similarity compared with the first speech among the plurality of candidate speeches, which are different from the first speech, among the plurality of candidate speeches generated in the first speech determination part is obtained as the second speech, and in the first speech determination part, each of the candidate speeches is a speech in response to the speech of the human and the plurality of candidate speeches are generated so that similarity between the plurality of candidate speeches is lowered.

4. A non-transitory computer-readable recording medium that records a program for causing a computer to function as the dialog system according to claim 2.

5. A non-transitory computer-readable recording medium that records a program for causing a computer to function as the dialog apparatus according to claim 3.

6. A dialog method performed by a dialog system, the dialog method comprising:

a speech receiving step in which the dialog system receives input of a speech of a human;

a first speech determination step in which the dialog system determines a first speech which is a speech in response to the speech of the human;

a first speech presentation step in which the first speech is presented by the dialog system;

a reaction acquisition step in which the dialog system acquires a reaction of the human to the first speech;

an action determining step in which the dialog system determines, in a case that the reaction of the human is a reaction indicating that the first speech is not a speech in response to the speech of the human, action contents which are contents of actions of expressing that the first speech is not a speech in response to the speech of the human; and an action step in which the dialog system performs an action with the action contents, wherein the dialog system comprising a first agent and a second agent different from the first agent, in the first speech presentation step, the first speech is presented by the first agent, the action contents indicates contents of a second non-language communication which is a non-language communication expressing that the first speech is not a speech in response to the speech of the human, and the action with the action contents is an action where the second agent performs the second non-language communication, in the first speech determination step, a plurality of candidate speeches which are speech candidates for the speech of the human are generated and one of the plurality of candidate speeches is obtained as the first speech, in the second speech determination step, one candidate speech which is different from the first speech is obtained as the second speech from among the plurality of candidate speeches generated in the first speech determination step, in the first speech determination step, three or more candidate speeches are generated, in the second speech determination step, similarities between the first speech and a plurality of candidate speeches, which are different from the first speech, are calculated, and a candidate speech other than a candidate speech having the highest similarity compared with the first speech among the plurality of candidate speeches, which are different from the first speech, among the plurality of candidate speeches generated in the first speech determination step is obtained as the second speech, and in the first speech determination step, each of the candidate speeches is a speech in response to the speech of the human and the plurality of candidate speeches are generated so that similarity between the plurality of candidate speeches is lowered.

7. A dialog system comprising:

a speech receiving part that receives input of a speech of a human;

a first speech determination part that determines a first speech which is a speech in response to the speech of the human;

a first speech presentation part in which the dialog system presents the first speech;

a reaction acquisition part that acquires a reaction of the human to the first speech;

an action determining part that determines, in a case that the reaction of the human is a reaction indicating that the first speech is not a speech in response to the speech of the human, action contents which are contents of actions of expressing that the first speech is not a speech in response to the speech of the human; and an action part that performs an action with the action contents, wherein the dialog system comprising a first agent and a second agent different from the first agent, in the first speech presentation part, the first agent presents the first speech, the action contents indicates contents of a second non-language communication which is a non-language communication expressing that the first speech is not a speech in response to the speech of the human, and the action with the action contents is an action where the second agent performs the second non-language communication, in the first speech determination part, a plurality of candidate speeches which are speech candidates for the speech of the human are generated and one of the plurality of candidate speeches is obtained as the first speech, in the second speech determination part, one candidate speech which is different from the first speech is obtained as the second speech from among the plurality of candidate speeches generated in the first speech determination part, in the first speech determination part, three or more candidate speeches are generated, in the second speech determination part, similarities between the first speech and a plurality of candidate speeches, which are different from the first speech, are calculated, and a candidate speech other than a candidate speech having the highest similarity compared with the first speech among the plurality of candidate speeches, which are different from the first speech, among the plurality of candidate speeches generated in the first speech determination part is obtained as the second speech, and in the first speech determination part, each of the candidate speeches is a speech in response to the speech of the human and the plurality of candidate speeches are generated so that similarity between the plurality of candidate speeches is lowered.

8. The dialog method according to claim 1 or 6, further comprising:

an action determining step in which the dialog system determines, in the case, action contents which are contents of actions of expressing that the first speech is not a speech in response to the speech of the human; and an action step in which the dialog system performs actions with the action contents prior to the second speech presentation step.

* * * * *